(12) United States Patent
Lemmers, Jr. et al.

(10) Patent No.: US 11,697,998 B1
(45) Date of Patent: Jul. 11, 2023

(54) CONSTANT SPEED DRIVE TO CONTROL VARIABLE APU SPEED AND CONSTANT GENERATOR OUTPUT FREQUENCY

(71) Applicant: Hamilton Sundstrand Corporation, Charlotte, NC (US)

(72) Inventors: Glenn C. Lemmers, Jr., Loves Park, IL (US); Jonathan C. Dell, Elgin, IL (US); David S. Behling, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/716,111

(22) Filed: Apr. 8, 2022

(51) Int. Cl.
*F01D 15/10* (2006.01)
*F02C 9/28* (2006.01)
*F02C 7/32* (2006.01)

(52) U.S. Cl.
CPC .............. *F01D 15/10* (2013.01); *F02C 7/32* (2013.01); *F02C 9/28* (2013.01); *F05D 2220/50* (2013.01); *F05D 2220/7642* (2013.01); *F05D 2270/02* (2013.01); *F05D 2270/304* (2013.01); *F05D 2270/56* (2013.01)

(58) Field of Classification Search
CPC .... F01D 15/10; F02C 7/32; F02C 9/28; F05D 2220/50; F05D 2220/7642; F05D 2270/02; F05D 2270/304; F05D 2270/56
See application file for complete search history.

(56) References Cited

U.S. PATENT DOCUMENTS

| 3,307,426 | A | 3/1967 | Whitaker |
| RE29,579 | E | 3/1978 | Simon |
| 4,310,768 | A | 1/1982 | Colley |
| 4,609,842 | A | 9/1986 | Aleem et al. |
| 4,625,160 | A | 11/1986 | Hucker |
| 5,285,626 | A | 2/1994 | Leeson |
| 6,561,940 | B2 * | 5/2003 | Goi ............ F16H 37/086 475/216 |
| 7,396,311 | B2 | 7/2008 | Ali et al. |
| 7,704,177 | B2 | 4/2010 | Vornehm et al. |
| 7,942,079 | B2 | 5/2011 | Russ |
| 8,424,280 | B2 | 4/2013 | Moore et al. |
| 8,742,605 | B1 | 6/2014 | Wilhide et al. |
| 8,845,485 | B2 | 9/2014 | Smithson et al. |
| 8,966,875 | B2 | 3/2015 | Suciu et al. |
| 9,470,302 | B1 | 10/2016 | Lemmers, Jr. et al. |
| 9,994,332 | B2 | 6/2018 | Ullyott et al. |

(Continued)

*Primary Examiner* — Gerald L Sung
*Assistant Examiner* — Rene D Ford
(74) *Attorney, Agent, or Firm* — Cantor Colburn LLP

(57) ABSTRACT

An aircraft power system includes an auxiliary power unit (APU), a generator, and a constant speed drive (CSD). The APU drives an APU drive shaft at a first rotational speed during a first condition and a second rotational speed during a second condition. The generator is rotatably coupled to a generator shaft and produces an AC voltage having a target frequency in response to rotation of the generator shaft at a target rotational speed. The CSD unit receives the first rotational speed from the APU drive shaft and rotates the generator shaft at the target rotational speed based on the first rotational speed. The CSD further receives the second rotational speed from the APU drive shaft and rotates the generator shaft at the target rotational speed based on the second rotational speed.

15 Claims, 2 Drawing Sheets

(56) References Cited

U.S. PATENT DOCUMENTS

| | | |
|---|---|---|
| 10,541,634 B2 | 1/2020 | Patel et al. |
| 10,850,863 B2 | 12/2020 | Bisson et al. |
| 10,934,930 B2 | 3/2021 | Jones et al. |
| 10,974,844 B2 | 4/2021 | White |
| 10,988,266 B2 | 4/2021 | White |
| 11,034,463 B2 | 6/2021 | White |
| 11,226,026 B2 | 1/2022 | Bortoli et al. |
| 2011/0314963 A1 | 12/2011 | Poisson |
| 2016/0348788 A1* | 12/2016 | Lemmers, Jr. .......... F16H 47/04 |
| 2018/0269817 A1* | 9/2018 | Patel .................. H02P 9/48 |
| 2020/0102885 A1 | 4/2020 | Kupratis et al. |
| 2020/0216180 A1* | 7/2020 | Szillat .................. F02C 6/08 |
| 2020/0256431 A1 | 8/2020 | Duong et al. |
| 2021/0351731 A1 | 11/2021 | Koenig et al. |

* cited by examiner

CONSTANT SPEED DRIVE TO CONTROL VARIABLE APU SPEED AND CONSTANT GENERATOR OUTPUT FREQUENCY

BACKGROUND

Embodiments of the present disclosure are directed generally to aircraft systems, and more specifically, to aircraft electric power generation systems.

Aircrafts are known to employ an auxiliary power unit (APU) that is rotatably coupled to a direct drive generator to generate electric power for powering the aircraft. During operation, the APU drive shaft rotates to drive the generator, and the generator outputs alternating current (AC) electrical power in response to the rotation of the APU drive shaft. The rotational speed of the APU directly controls the frequency of the power output from the generator. For example, reducing the rotational speed of the APU reduces the frequency of power output from the generator while increasing the speed of the APU increases the frequency of power output from the generator. Aircrafts typically operate according to standardized power characteristics (e.g., 400 Hz). Therefore, the APU is controlled so that the APU drive shaft rotates at a fixed speed in order to produce and sustain a targeted output power frequency (e.g., 400 Hz) to meet the standardized power characteristics.

BRIEF DESCRIPTION

According to a non-limiting embodiment, an aircraft power system includes an auxiliary power unit (APU), a generator, and a constant speed drive (CSD). The APU drives an APU drive shaft at a first rotational speed during a first condition and a second rotational speed greater than the first during a second condition. The generator is rotatably coupled to a generator shaft and produces an alternating current (AC) voltage having a target frequency in response to rotation of the generator shaft at a target rotational speed. The constant speed drive (CSD) unit includes an input rotatably coupled to the APU drive shaft and an output rotatably coupled to the generator shaft. The CSD unit receives the first rotational speed from the APU drive shaft and rotates the generator shaft at the target rotational speed based on the first rotational speed. The CSD further receives the second rotational speed from the APU drive shaft and rotates the generator shaft at the target rotational speed based on the second rotational speed.

In addition to one or more of the features described herein, or as an alternative, further embodiments may further comprise a CSD controller in signal communication with the CSD unit. The CSD controller is configured to determine a rotational speed of the APU drive shaft and actively control the CSD unit to rotate the generator shaft at the target rotational speed in response to determining the first and second rotational speeds fall within a target speed range.

In addition to one or more of the features described herein, or as an alternative, further embodiments may further comprise a speed sensor coupled to the APU drive shaft and configured to output a speed signal indicative of the rotational speed of the APU drive shaft.

In addition to one or more of the features described herein, or as an alternative, further embodiments may include a feature, wherein the CSD controller controls the CSD unit to maintain the constant rotational power delivered to the generator in response determining changing the rotational speed of the APU drive shaft among a plurality of different speeds included in the target speed range.

In addition to one or more of the features described herein, or as an alternative, further embodiments may include a feature, wherein the rotational speed of the APU drive shaft is changed among a first speed range included within the target speed range and second speed range included within the target speed range.

In addition to one or more of the features described herein, or as an alternative, further embodiments may include a feature, wherein the speeds included in the first speed range are less than the speeds included in the second speed range.

In addition to one or more of the features described herein, or as an alternative, further embodiments may include a feature, wherein the second speed range excludes the speeds included in the first speed range.

In addition to one or more of the features described herein, or as an alternative, further embodiments may further comprise an APU controller in signal communication with the gas turbine engine, the APU controller configured to control the gas turbine engine to rotate the drive shaft at the first rotational speed in response to detecting a first condition, and to control the gas turbine engine to rotate the drive shaft at the second rotational speed in response to detecting a second condition.

In addition to one or more of the features described herein, or as an alternative, further embodiments may include a feature, wherein the first condition is a first altitude and the second condition is a second altitude different from the first altitude.

According to yet another non-limiting embodiment, a method of controlling an aircraft power system comprises driving an auxiliary power unit (APU) drive shaft at a first rotational speed during a first condition using an APU and driving the APU drive shaft at a second rotational speed greater than the first during a second condition using the APU. The method further comprises transferring one of a first rotational power to a constant speed drive (CSD) unit via the APU drive shaft based on the first rotational speed and a second rotational power to the CSD unit via the APU drive shaft based on the second rotational speed. The method further comprises converting the first rotational power into a constant rotational power using the CSD to drive a generator drive shaft coupled to a generator at a constant target rotational speed, and converting the second rotation power into the constant rotational power using the CSD to drive the generator drive shaft coupled to the generator at the constant target rotational speed. The method further comprises producing an alternating current (AC) voltage having a target frequency using the generator in response to rotation of the generator shaft at the constant target rotational speed.

In addition to one or more of the features described herein, or as an alternative embodiment, the method further comprises determining a rotational speed of the APU drive shaft using a CSD controller, and actively controlling the CSD unit to rotate the generator shaft at the target rotational speed using the CSD controller in response to determining the first and second rotational speeds fall within a target speed range.

In addition to one or more of the features described herein, or as an alternative embodiment, the method further comprises outputting a speed signal from a speed sensor, the speed signal indicative of the rotational speed of the APU drive shaft.

In addition to one or more of the features described herein, or as an alternative embodiment, the method further comprises controlling the CSD unit to maintain the constant rotational power delivered to the generator in response determining changing the rotational speed of the APU drive shaft among a plurality of different speeds included in the target speed range.

In addition to one or more of the features described herein, or as an alternative embodiment, the method further comprises changing the rotational speed of the APU drive shaft among a first speed range included within the target speed range and changing the rotational speed of the APU drive shaft among a second speed range included within the target speed range.

In addition to one or more of the features described herein, or as an alternative embodiment, the method further comprises, wherein the speeds included in the first speed range are less than the speeds included in the second speed range.

In addition to one or more of the features described herein, or as an alternative embodiment, the method further comprises an APU controller in signal communication with the gas turbine engine, the APU controller configured to control the gas turbine engine to rotate the drive shaft at the first rotational speed in response to detecting a first condition, and to control the gas turbine engine to rotate the drive shaft at the second rotational speed in response to detecting a second condition.

In addition to one or more of the features described herein, or as an alternative embodiment, the method further comprises, wherein the first condition is a first altitude and the second condition is a second altitude different from the first altitude.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
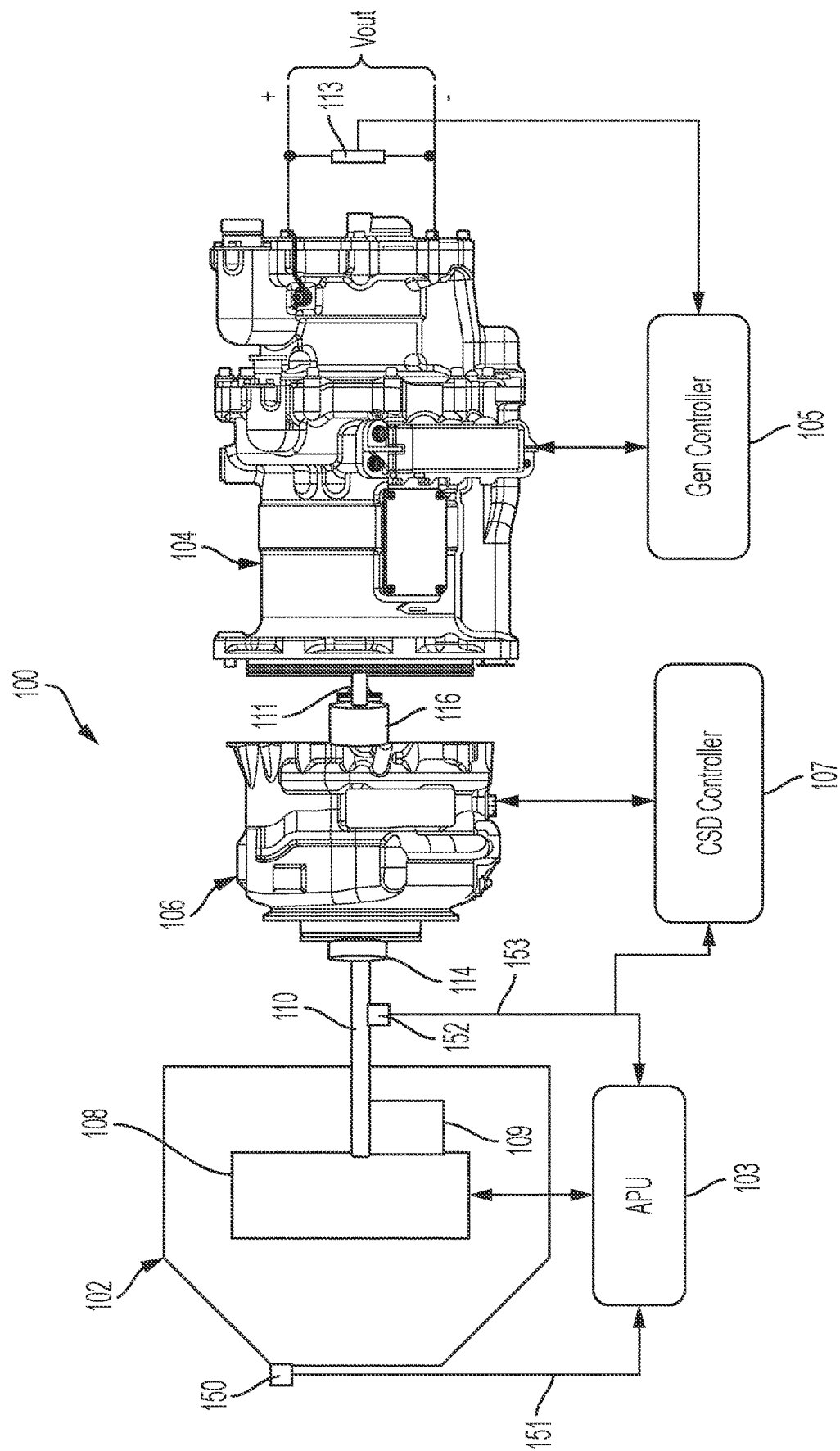
FIG. 1 is a block diagram illustrating an aircraft power system according to a non-limiting embodiment.

A detailed description of one or more embodiments of the disclosed apparatus and method are presented herein by way of exemplification and not limitation with reference to the Figures. The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

Turning now to an overview of the technology related to the present disclosure, the APU (e.g., the APU engine) requires fuel to drive the APU drive shaft and is a significant source of aircraft fuel consumption. Therefore, changing the operating speed of the APU varies its fuel consumption. The APU drive shaft implemented in a conventional APU-generator arrangement is coupled directly between the APU and the generator. Thus, the frequency of the power output from the generator is directly dependent on the operational speed of the APU. This arrangement, however, prevents varying the operating speed of APU because doing so will cause the frequency of the power output from the generator to drift from the aircraft target frequency (e.g., 400 Hz).

Different altitudes affect the power output of an APU. For example, power output is lower at higher altitudes such as high altitude (e.g., 30,000 ft.) compared to low altitudes such as sea level, for example. To compensate for differences in altitudes, the size, specifications, and fuel consumption of the APU are designed according to high altitude conditions to ensure sufficient output power is provided at both sea level and high altitudes. At sea level, however, the APU is operated at higher operational speeds than necessary resulting in fuel consumption inefficiency. As discussed above, the operating speed of APU cannot be changed because doing so will cause the frequency of the power output from the generator to drift from the aircraft target frequency (e.g., 400 Hz). Consequently, the fuel efficiency of a conventional APU cannot be effectively improved.

Various non-limiting embodiments of the present disclosure provides an aircraft power system that includes a constant speed drive (CSD) unit coupled between the APU drive shaft and a direct drive generator (described herein as a "generator"). The CSD unit is configured to provide the generator with a targeted input rotational power and to maintain the targeted input rotational power while the operating speed of the APU (e.g., the APU drive shaft) is changed according to different aircraft conditions (e.g., sea level versus high altitudes (e.g., 30,000 ft), different surrounding temperature conditions, etc.). In this manner, the operating speed of the APU can be varied to improve fuel efficiency while still transferring the rotational power necessary to maintain the aircraft target frequency of the power output from the generator.

Turning now to FIG. 1, an aircraft power system 100 is illustrated according to a non-limiting embodiment of the present disclosure. The power system 100 includes an APU 102, a generator 104, and a constant speed drive (CSD) unit 106. The APU 102 is in signal communication with a first controller referred to herein as an APU controller 103. The generator 104 is in signal communication with a second controller referred to herein as a "generator controller" 105. The CSD unit 106 is in signal communication with a third controller referred to here as a "CSD controller" 107. Each of the controllers 103, 105 and 107 can include memory and a processor configured to execute algorithms and computer-readable program instructions stored in the memory. Although three independent controllers 103, 105 and 107 are illustrated, it should be appreciated that the APU controller 103, the generator controller 105, and the CSD controller 107 can be embedded or integrated together in a single controller. It should be appreciated that two or more of the controllers 103, 105 and 107 are in signal communication with one another to exchange various data, measurements and/or calculations.

The APU 102 includes a fuel consuming gas turbine engine 108, a gearbox 109, and an APU drive shaft 110. The gas turbine engine 108 operates to rotate the APU drive shaft 110 in response to an intake of fuel. The amount of fuel consumed by the gas turbine engine 108 controls the operational speed of the APU 102. For example, increasing the fuel consumption of the gas turbine engine 108 increases the rotational speed of the APU drive shaft 110, while reducing the fuel consumption decreases the rotational speed of the APU drive shaft 110. The APU gearbox 109 gearbox transfers power from the APU drive shaft 110 to engine accessories including, but not limited to, a fuel control unit, a lubrication system, and a cooling fan. In some embodiments, the gearbox is also coupled to a starter motor through a gear train to perform the starting function of the APU 102.

The APU controller 103 is in signal communication with the 108 gas turbine engine 108, an altitude sensor 150, and a rotation sensor 152. In one or more non-limiting embodiments, the APU controller 103 can be implemented as a Full Authority Digital Engine Control (FADEC) and configured to determine an altitude based on measured altitude readings 151 output from the altitude sensor 150 and can determine a rotational speed of the drive shaft 110 based on an output speed signal indicative measured rotational readings (rotations per minute (RPM)) 153 output from the rotation sensor 152. Although a rotation sensor 152 is described, it should be appreciated that the APU controller 103 can also calculate a rotational speeds of the drive shaft 110 based on the operation of the engine, e.g., the fuel consumption of the engine.

In one or more non-limiting embodiments, the APU controller 103 can determine changing altitudes based on the measured altitude readings and output a speed control signal that adjusts operating speed of the APU engine 108 based on the a given altitude. For example, the APU 102 can operate the APU engine 108 at a first rotational speed that rotates the drive shaft 110 at a first rotational speed (e.g., 21,630 RPM) at a lower altitude and a second operating speed (e.g. 24,034 RPM) that at a higher altitude. In this manner, the APU 102 can provide the necessary power output at high altitudes, and reduce power output at low altitudes so as to improve fuel consumption efficiency. In one or more non-limiting embodiments, the GCU 108 can store an APU look-up table (LUT) that maps a given altitude or altitude range to an APU operating condition. The APU operating condition can include, but is not limited to, an amount of fuel delivered to the APU engine 108, an operating speed of the APU engine 108, and a output rotational speed of the drive shaft 110.

The generator 104 is configured to receive input rotational power via a generator drive shaft 111 and generate high-voltage AC electrical power (e.g., 115 volts) having an output frequency that is a function of an excitation frequency and a rotational speed of the generator drive shaft 111. For example, the generator 104 can be implemented using a 3-phase winding on a generator rotor and a 3-phase winding on a generator stator. The rotation of the generator drive shaft 111 controls a frequency input to the rotor and the speed of rotation of the rotor, both of which dictate the output frequency of the power output from the generator 104. It should be appreciated, however, that other suitable configurations for implementing the generator 104 is contemplated without departing from the scope of the present disclosure. The high-voltage AC output from the generator 104 can be converted into a direct current (DC) voltage and/or a conditioned AC voltage (e.g., a lower AC voltage).

The generator controller 105 is in signal communication with the generator 104 and a voltage sensor 113. The voltage sensor 113 measures the AC output of the generator 104 and delivers the measured AC output to the generator controller 105. The controller 105 utilizes the measured AC output to determine the voltage level of the AC output, the current level output from the generator 104 and/or the frequency of the AC output. In this manner, the generator controller 105 can monitor the frequency of the AC output and control the generator (e.g., the 3-phase generator rotor) to maintain a targeted output frequency (e.g., 400 Hz).

The CSD unit 106 is mechanically coupled between the APU 102 and the generator 104. The CSD unit 106 takes a variable speed delivered from the APU 102 and hydro-mechanically produces a constant output speed (e.g., a constant RPM) that drives the generator 104 at a target speed. Accordingly, the CSD unit 106 operates to allow the APU 102 to operate at various discreet speeds within a target speed range, while regulating the rotational output speed to a target output speed (e.g., 24,000) necessary to operate the generator 104 at a rotational speed capable of generating an output power having a target output frequency (e.g., 400 Hz). To facilitate the conversation of the variable input speed to the constant output speed, the CSD unit 106 can be implement various drive systems including, but not limited to, a straight hydrostatic drive, a split power path configuration (e.g., a epicyclic differential combined with a hydrostatic drive), a belt drive, and a toroidal drive.

In one or more non-limiting embodiments, the various discreet speeds within the target speed range are selected to optimize fuel efficiency at different operating conditions. For example, the target speed range extend from a low-end speed (e.g., 20,429 RPM) to a high-end speed (e.g., 24,034 RPM). Thus, the CSD unit 106 will continuously output a constant target output speed (e.g., 24,000 RPM) for any input speed falling within the target speed range (e.g., 20,429 RPM-24,034 RPM). In this manner, the APU 102 can be operated at one or more low operating speeds (e.g., 20,429 RPM-22,000 RPM) when the aircraft is located at sea level where less fuel consumption is necessary to achieve the target output frequency (e.g., 400 Hz). However, the APU can be operated at one or more high operating speeds (e.g., 22,001 RPM-24,034 RPM) when the aircraft is located at cruising altitude where an increased amount of fuel consumption is necessary to achieve the target output frequency (e.g., 400 Hz). According to the non-limiting examples described herein, the speeds included in the first speed range (e.g., 20,429 RPM-22,000 RPM) are less than the speeds included in the second speed range (e.g., 22,001 RPM-24,034 RPM). According to the non-limiting examples described herein, the second speed range (e.g., 22,001 RPM-24,034 RPM) excludes the speeds included in the first speed range (e.g., 20,429 RPM-22,000 RPM). In any scenario described herein, the CSD unit 106 will continuously output a constant target output speed (e.g., 24,000 RPM) independent from a change in the APU operating speed.

Control signals generated by the CSD controller 107 can be used to control the operation of the CSD 106 based on the input speed of the drive shaft 110. In one or more non-limiting embodiments, the CSD controller 107 is in signal communication with the rotation sensor 152 to determine the rotational speed (e.g., RPMs) 153 of the drive shaft 110. Accordingly, when the CSD controller 107 determines that the rotational speed of the drive shaft 110 falls within the target speed range (e.g., 20,429 RPM-24,034 RPM), the CSD controller 107 outputs a command signal to actively control the hydro-mechanic components of the CSD 106 to drive the generator drive shaft 111 at a constant target output speed. When the generator 104 is implemented as a two-pole synchronous generator, the target rotational speed of the input generator shaft 111 can be, for example, 24,034 RPM. When the generator 104 is implemented as a four-pole synchronous generator, the target rotational speed of the input generator shaft 111 can be, for example, 12,017 RPM. When the generator 104 is implemented as a six-pole synchronous generator, the target rotational speed of the input generator shaft 111 can be, for example, 8,011 RPM. When the generator 104 is implemented as an eight-pole synchronous generator, the target rotational speed of the input generator shaft 111 can be, for example, 6,008 RPM.

A first end of the APU drive shaft 110 is coupled to the gas turbine engine 108, while an opposing second end of the APU drive shaft 110 is supported by the input hub 112 and is rotatably coupled to the CSD 106. The output hub 116 is rotatably coupled a the generator drive shaft 111, which can drive a 3-phase generator rotor included in the generator 104 as described herein. Accordingly, the rotation of the generator drive shaft 111 controls a frequency input to the rotor and the speed of rotation of the rotor, both of which dictate the output frequency of the power output from the generator 104. Because the CSD 106 can drive the generator drive shaft 111 independent of the main drive shaft 110, the operation speed of the APU engine 108 can be changed or varied according to different discreet speeds within a target speed range without affecting the rotation speed of the input generator shaft 111, and thus the rotational input power delivered to generator 104. In this manner, the operating speed of the APU 102 can be adjusted according to different conditions to improve fuel consumption efficiency, while the CSD unit 106 continuously drives the generator drive shaft 111 at a targeted rotational speed necessary to produce and sustain a targeted output power frequency (e.g., 400 Hz).

Figure 2:
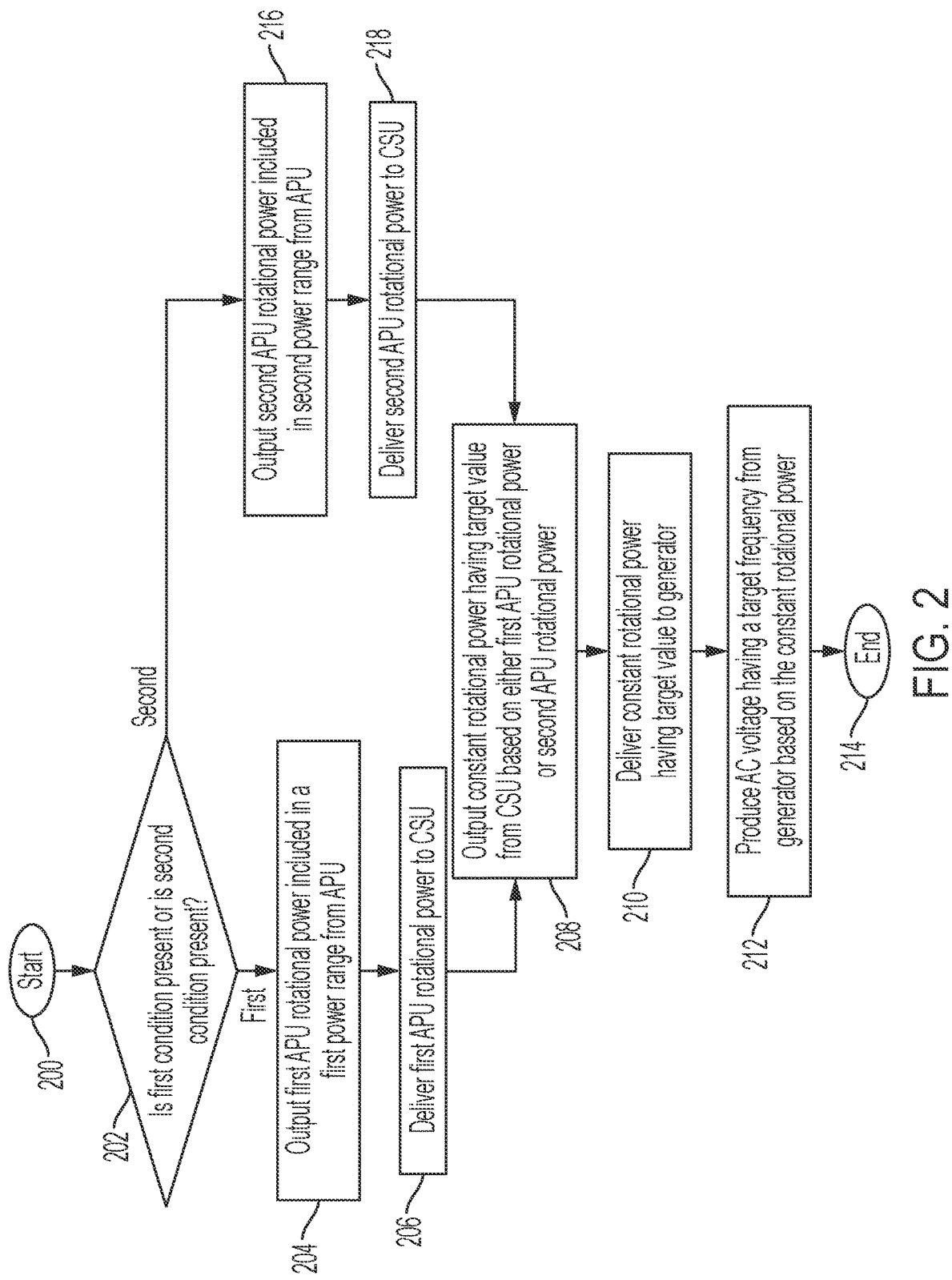
FIG. 2 is a flow diagram illustrating a method of controlling an aircraft power system according to a non-limiting embodiment.

Turning now to FIG. 2, a method of controlling a power system of an aircraft is illustrated according to a non-limiting embodiment. The method begins at operation 200, and at operation 202 the aircraft is determined to be operating during a first condition or a second condition. In one or more non-limiting embodiments, the first condition is a first altitude (e.g., sea level) and the second condition is a second altitude (e.g., 40,000 ft) different from the first condition.

When the aircraft is operating during the first condition, the APU outputs a first APU rotational power included in a first power range (e.g., the low power range) at operation 204, which in turn drives an APU drive shaft. Based on the first power range, the APU can drive the APU drive shaft at low speed included in a range of low rotational speeds (e.g., 20,429 RPM-22,000 RPM) at low altitudes (e.g., sea level). At operation 206, the first APU rotational power is delivered to a CSU. At operation 208, the CSU outputs a constant rotational power having a target value based on the first APU rotational power. In one or more non-limiting embodiments, the constant rotational power having the target value is a rotational speed (RPM) having a target rotational speed. At operation 210, the constant rotational power having the target value is delivered to the aircraft generator. At operation 212, the generator produces an AC voltage having a target frequency (e.g., about 400 Hz) based on the constant rotational power, and the method ends at operation 214.

When the aircraft is determined to be operating during the second condition at operation 202, the APU outputs a second APU rotational power included in a second power range (e.g., the high power range) at operation 216. Accordingly, the APU can drive the APU drive shaft at a high speed included in a range of high rotational speeds (e.g., 22,001 RPM-24,034 RPM) at high altitudes (e.g., 40,000 ft). At operation 218, the second APU rotational power is delivered to the CSU. Proceeding to operation 208, the CSU outputs the constant rotational power having the target value based on the second APU rotational power. At operation 210, the constant rotational power having the target value is delivered to the aircraft generator. At operation 212, the generator produces an AC voltage having the target frequency (e.g., about 400 Hz) based on the constant rotational power, and the method ends at operation 214.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft power system comprising:
   an auxiliary power unit (APU) configured to drive an APU drive shaft at a first rotational speed during a first condition and a second rotational speed greater than the first condition during a second condition;
   a generator rotatably coupled to a generator shaft and configured to produce an alternating current (AC) voltage having a target frequency in response to rotation of the generator shaft at a target rotational speed;
   a constant speed drive (CSD) unit including an input rotatably coupled to the APU drive shaft and an output rotatably coupled to the generator shaft, the CSD unit configured to receive the first rotational speed from the APU drive shaft and rotate the generator shaft at the target rotational speed based on the first rotational speed, and to receive the second rotational speed from the APU drive shaft and rotate the generator shaft at the target rotational speed based on the second rotational speed,
   wherein the first condition is a first altitude range at which the APU drives the APU drive shaft at the first rotational speed falling within a first speed range which ranges from about 20,429 RPM to about 22,000 RPM, and the second condition is a second altitude at which the APU drives the APU drive shaft at the second rotational speed falling within a second speed range which ranges from about 22,001 RPM to about 24,034 RPM.

2. The aircraft power system of claim 1, further comprising a CSD controller in signal communication with the CSD unit, the CSD controller configured to determine a rotational speed of the APU drive shaft and actively control the CSD unit to rotate the generator shaft at the target rotational speed in response to determining the first and second rotational speeds fall within a target speed range.

3. The aircraft power system of claim 2, further comprising a speed sensor coupled to the APU drive shaft and configured to output a speed signal indicative of the rotational speed of the APU drive shaft.

4. The aircraft power system of claim 2, wherein the CSD controller controls the CSD unit to maintain a constant rotational power delivered to the generator at the target rotational speed in response determining a change in the rotational speed of the APU drive shaft among a plurality of different speeds included in the target speed range.

5. The aircraft power system of claim 4, wherein the rotational speed of the APU drive shaft is changed among a first speed range included within the target speed range and second speed range included within the target speed range.

6. The aircraft power system of claim 5, wherein the speeds included in the first speed range are less than the speeds included in the second speed range.

7. The aircraft power system of claim 6, wherein the second speed range excludes the speeds included in the first speed range.

8. The aircraft power system of claim 7, further comprising an APU controller in signal communication with a gas turbine engine forming the APU, the APU controller configured to control the gas turbine engine to rotate the drive shaft at the first rotational speed in response to detecting the first condition, and to control the gas turbine engine to rotate the drive shaft at the second rotational speed in response to detecting the second condition.

9. A method of controlling an aircraft hydraulic control system, the method comprising:
    driving an auxiliary power unit (APU) drive shaft at a first rotational speed during a first condition using an APU and driving the APU drive shaft at a second rotational speed greater than the first during a second condition using the APU;
    transferring one of a first rotational power to a constant speed drive (CSD) unit via the APU drive shaft based on the first rotational speed and a second rotational power to the CSD unit via the APU drive shaft based on the second rotational speed;
    converting the first rotational power into a constant rotational power using the CSD to drive a generator drive shaft coupled to a generator at a constant target rotational speed, and converting the second rotation power into the constant rotational power using the CSD to drive the generator drive shaft coupled to the generator at the constant target rotational speed; and
    producing an alternating current (AC) voltage having a target frequency using the generator in response to rotation of the generator shaft at the constant target rotational speed,
    wherein the first condition is a first altitude range at which the APU drives the APU drive shaft at the first rotational speed falling within a first speed range which ranges from about 20,429 RPM to about 22,000 RPM, and the second condition is a second altitude at which the APU drives the APU drive shaft at the second rotational speed falling within a second speed range which ranges from about 22,001 RPM to about 24,034 RPM.

10. The method of claim 9, further comprising determining a rotational speed of the APU drive shaft using a CSD controller, and actively controlling the CSD unit to rotate the generator shaft at the target rotational speed using the CSD controller in response to determining the first and second rotational speeds fall within a target speed range.

11. The method of claim 10, further comprising outputting a speed signal from a speed sensor, the speed signal indicative of the rotational speed of the APU drive shaft.

12. The method of claim 10, further comprising controlling the CSD unit to maintain the constant rotational power delivered to the generator in response to a change in the rotational speed of the APU drive shaft among a plurality of different speeds included in the target speed range.

13. The method of claim 12, further comprising changing the rotational speed of the APU drive shaft among a first speed range included within the target speed range and changing the rotational speed of the APU drive shaft among a second speed range included within the target speed range.

14. The method of claim 13, wherein the speeds included in the first speed range are less than the speeds included in the second speed range.

15. The method of claim 14, further comprising an APU controller in signal communication with a gas turbine engine forming the APU, the APU controller configured to control the gas turbine engine to rotate the drive shaft at the first rotational speed in response to detecting the first condition, and to control the gas turbine engine to rotate the drive shaft at the second rotational speed in response to detecting the second condition.

\* \* \* \* \*